United States Patent
Olarig

(10) Patent No.: US 6,230,223 B1
(45) Date of Patent: *May 8, 2001

(54) DUAL PURPOSE APPARATUS METHOD AND SYSTEM FOR ACCELERATED GRAPHICS OR SECOND MEMORY INTERFACE

(75) Inventor: Sompong P. Olarig, Cypress, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/088,131

(22) Filed: Jun. 1, 1998

(51) Int. Cl.$^7$ .................................................. G06F 13/14
(52) U.S. Cl. ...................... 710/126; 710/104; 710/101; 710/56; 712/32
(58) Field of Search .................... 710/126, 110, 710/101, 113, 104, 56; 712/32, 33, 36, 38

(56) References Cited

U.S. PATENT DOCUMENTS

| | | |
|---|---|---|
| 5,479,627 | 12/1995 | Khalidi et al. |
| 5,664,161 | 9/1997 | Fukushima et al. |
| 5,717,873 * | 2/1998 | Rabe et al. ........................ 710/110 |
| 5,734,847 * | 3/1998 | Garbus et al. ..................... 710/128 |
| 5,740,381 * | 4/1998 | Yen .................................. 710/113 |
| 5,761,458 * | 6/1998 | Young et al. ...................... 710/128 |
| 5,796,963 * | 8/1998 | Odom ............................... 710/128 |
| 5,802,568 | 9/1998 | Csoppenszky . |
| 5,812,789 * | 9/1998 | Diaz et al. ......................... 709/247 |
| 5,835,962 | 11/1998 | Chang et al. . |
| 5,999,743 * | 12/1999 | Horan et al. ...................... 395/876 |

OTHER PUBLICATIONS

Halfhil, "Unclogging the PC Bottlenecks", *BYTE* Sep. 1997, vol. 22, No. 9.
Yong, "AGP Speeds 3D Graphics" *Microprocessor Report*, Jun. 17, 1996.
Brummer, "PCI–to–AGP Move Boosts 3–D Graphics" *Electronic Engineering Times*, 1997, N952, p. 84.

* cited by examiner

Primary Examiner—Thomas C. Lee
Assistant Examiner—Abdelmoniem Elamin
(74) Attorney, Agent, or Firm—Williams, Morgan & Amerson, P.C.

(57) ABSTRACT

A multiple use core logic chipset is provided in a computer system that may be configured either as a bridge between an accelerated graphics port ("AGP") bus and host and memory buses, or as a second memory interface. The function of the multiple use chipset is determined at the time of manufacture of the computer system, or in the field whether an AGP bus bridge or a second memory interface is to be implemented. Selection of the type of bus bridge (AGP or second memory interface) in the multiple use core logic chipset may be implemented by a hardware signal input, or by software during computer system configuration or power on self test ("POST"). Software configuration may also be determined upon detection of either an AGP device or a second memory connected to the core logic chipset.

23 Claims, 9 Drawing Sheets

DUAL PURPOSE APPARATUS METHOD AND SYSTEM FOR ACCELERATED GRAPHICS OR SECOND MEMORY INTERFACE

CROSS REFERENCE TO RELATED PATENT APPLICATIONS

This patent application is related to commonly owned U.S. patent applications Ser. No. 08/853,289 now U.S. Pat. No. 5,889,970; filed May 9, 1997; entitled "Dual Purpose Apparatus, Method And System For Accelerated Graphics Port And Peripheral Component Interconnect" by Ronald T. Horan and Sompong P. Olarig; U.S. Ser. No. 08/885,062 now U.S. Pat. No. 5,892,964; filed Jun. 30, 1997; entitled "Apparatus, Method And System For Dual Accelerated Graphics Ports" by Ronald T. Horan, Gary W. Thome and Sompong P. Olarig; and U.S. Ser. No. 09/038,412 now U.S. Pat. No. 6,078,338; filed Mar. 11, 1998; entitled "Accelerated Graphics Port Programmable Memory Access Arbiter" by Ronald T. Horan, Phillip M. Jones, Gregory N. Santos, Robert Allan Lester and Gary J. Piccirillo; all of the above mentioned applications are hereby incorporated by reference.

BACKGROUND OF THE INVENTION

1. Field of the Invention

The present invention relates to computer systems using a core logic chipset to interface a central processor(s) (CPU), video graphics processor, input-output peripherals and random access memory together, and more particularly, in utilizing the same core logic circuits for an accelerated graphics port or a second random access memory interface.

2. Description of the Related Technology

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened many new applications heretofore unavailable or too expensive for the use of older technology mainframe computers. These personal computers may be stand-alone workstations (high end individual personal computers), desk-top personal computers, portable lap-top computers and the like, or they may be linked together in a network by a "network server" which is also a personal computer which may have additional features specific to its purpose in the network. The network server may be used to store massive amounts of data, and may facilitate interaction of the individual workstations connected to the network for electronic mail ("E-mail"), document databases, video teleconferencing, whiteboarding, integrated enterprise calendar, virtual engineering design and the like. Multiple network servers may also be interconnected by local area networks ("LAN") and wide area networks ("WAN").

A computer system has a plurality of information (data and address) buses such as a host bus, a memory bus, high speed expansion buses such as an Accelerated Graphics Port (AGP) bus, a Peripheral Component Interconnect (PCI) bus, and other peripheral buses such as the Small Computer System Interface (SCSI), Extension to Industry Standard Architecture (EISA), and Industry Standard Architecture (ISA). The processor(s) of the computer system communicates with main memory and with the peripherals that make up the computer system over these various buses.

A significant part of the ever-increasing popularity of the personal computer, besides its low cost relative to just a few years ago, is its ability to run sophisticated programs and perform many useful and new tasks. Personal computers today may be easily upgraded with new peripheral devices for added flexibility and enhanced performance. A major advance in the performance of personal computers (both workstation and network servers) has been the implementation of sophisticated peripheral devices such as video graphics adapters, local area network interfaces, SCSI bus adapters, full motion video, redundant error checking and correcting disk arrays, and the like. These sophisticated peripheral devices are capable of data transfer rates approaching the native speed of the computer system's central processing unit ("CPU").

The peripheral devices' data transfer speeds are achieved by connecting the peripheral devices to the microprocessor(s) and associated system random access memory through high-speed expansion local buses. Most notably, a high speed expansion local bus standard has emerged that is microprocessor independent and has been embraced by a significant number of peripheral hardware manufacturers and software programmers. This high-speed expansion bus standard is called the "Peripheral Component Interconnect" or "PCI." A more complete definition of the PCI local bus may be found in the PCI Local Bus Specification, revision 2.1; PCI/PCI Bridge Specification, revision 1.0; PCI System Design Guide, revision 1.0; and PCI BIOS Specification, revision 2.1, the disclosures of which are hereby incorporated by reference. These PCI specifications are available from the PCI Special Interest Group, P.O. Box 14070, Portland, Oreg. 97214.

A computer system has a plurality of information (data and address) buses such as a host bus, a memory bus, at least one high speed expansion local bus such as the PCI bus, and other peripheral buses such as the Small Computer System Interface (SCSI), Extension to Industry Standard Architecture (EISA), and Industry Standard Architecture (ISA). The microprocessor(s) of the computer system communicates with main memory and with the peripherals that make up the computer system over these various buses. The microprocessor(s) communicates to the main memory over a host bus to memory bus bridge. The peripherals, depending on their data transfer speed requirements, are connected to the various buses which are connected to the microprocessor host bus through bus bridges that detect required actions, arbitrate, and translate both data and addresses between the various buses.

Increasingly sophisticated microprocessors have revolutionized the role of the personal computer by enabling complex applications software to run at mainframe computer speeds. The latest microprocessors have brought the level of technical sophistication to personal computers that, just a few years ago, was available only in mainframe and mini-computer systems. Some representative examples of these new microprocessors are the "PENTIUM" and "PENTIUM PRO" (registered trademarks of Intel Corporation). Advanced Micro Devices, Digital Equipment Corporation, Cyrix, IBM and Motorola also manufacture advanced microprocessors.

These sophisticated microprocessors have, in turn, made possible running complex application programs using advanced three dimensional ("3-D") graphics for computer aided drafting and manufacturing, engineering simulations, games and the like. Increasingly complex 3-D graphics require higher speed access to ever-larger amounts of graphics data stored in memory. This memory may be part of the video graphics processor system, but, preferably, would be best (lowest cost) if part of the main computer system memory. Intel Corporation has proposed a low cost but improved 3-D graphics standard called the "Accelerated Graphics Port" (AGP) initiative. With AGP 3-D, graphics data, in particular textures, may be shifted out of the graphics controller local memory to computer system memory. The computer system memory is lower in cost than the graphics controller local memory and is more easily adapted for a multitude of other uses besides storing graphics data. The proposed Intel AGP 3-D graphics standard defines a high-speed data pipeline, or "AGP bus," between the graphics controller and system memory. This AGP bus has sufficient bandwidth for the graphics controller to retrieve textures from system memory without materially affecting computer system performance for other non-graphics operations. The Intel 3-D graphics standard is a specification, which provides signal, protocol, electrical, and mechanical specifications for the AGP bus and devices attached thereto. This specification is entitled "Accelerated Graphics Port Interface Specification version 2.0," dated May 4, 1998; and also "Accelerated Graphics Port Interface Specification version 1.0," dated Jul. 31, 1996 are hereby incorporated by reference. The AGP specification, both versions 2.0 and 1.0, are available from Intel Corporation, Santa Clara, Calif.

The AGP interface specification uses the 66 MHz PCI (Revision 2.1) as an operational baseline, with three performance enhancements to the PCI specification which are used to optimize the AGP specification for high performance 3-D graphics applications. These enhancements are: 1) pipelined memory read and write operations, 2) demultiplexing of address and data on the AGP bus by use of sideband signals, and 3) data transfer rates in excess of 500 megabytes per second ("MB/sec.") using the AGP 2× mode. The remaining AGP specification does not modify the PCI 2.1 Specification, but rather provides a range of graphics-oriented performance enhancements for use by the 3-D graphics hardware and software designers. The AGP specification is neither meant to replace or diminish full use of the PCI standard in the computer system. The AGP specification creates an independent and additional high speed local bus for use by 3-D graphics devices such as a graphics controller, wherein the other input-output ("I/O") devices of the computer system may remain on any combination of the PCI, SCSI, EISA and ISA buses.

To functionally enable this AGP 3-D graphics bus, new computer system hardware and software are required. This requires new computer system core logic designed to function as a host bus/memory bus/PCI bus to AGP bus bridge meeting the AGP specification, and new Read Only Memory Basic Input Output System ("ROM BIOS") and Application Programming Interface ("API") software to make the AGP dependent hardware functional in the computer system. The computer system core logic must still meet the PCI standards referenced above and facilitate interfacing the PCI bus(es) to the remainder of the computer system. This adds additional costs to a personal computer system, but is well worth it if 3-D graphics are utilized. Some personal computer uses such as a network server do not require 3-D graphics, but would greatly benefit from having a second random access memory interface.

AGP capabilities are very desirable in a personal computer utilizing 3-D graphics, however, it is wasteful and redundant for those personal computers not requiring 3-D capabilities. The cost/performance (i.e., flexibility of the computer for a given price) of a personal computer is of paramount importance for commercial acceptance in the market place. In today's competitive computer industry, technical performance alone does not guarantee commercial success. Technical performance and flexibility of use for any personal computer product must be maximized while constantly reducing its manufacturing costs. To achieve a high performance to cost ratio, commonality of components and high volume of use are important factors. Thus, commonality of components such as logic circuits, printed circuit boards, microprocessors, computer boxes and power supplies, will drive the costs down for both workstations and servers. In addition, the high-end workstations and network servers would benefit if one generic model of a personal computer could be effectively used in either capacity. Further benefits in reducing costs may be realized by using common components in portable and desktop (consumer and low-end business) computers.

What is needed is an apparatus, method, and system for a personal computer that may provide a second memory interface by utilizing multiple use high production volume logic and interface circuits having the capability of providing either the second memory interface or an AGP interface.

SUMMARY OF THE INVENTION

The present invention overcomes the above-identified problems as well as other shortcomings and deficiencies of existing technologies by providing in a computer system a multiple use core logic chipset that may be configured to provide either an AGP bus interface or a second memory interface. The function of the multiple use chipset is determined at the time of manufacture of the computer system, or may be changed in the field to an AGP bus interface or a second memory interface. The core logic chipset has provisions for the AGP bus and second memory interface signals, and is adapted for connection to either the AGP bus or the second memory system. Selection of which configuration (AGP or second memory interface) the core logic chipset of the present invention is to assume may be determined by the type of computer system printed circuit motherboard utilized with the core logic chipset, by software during computer system startup (POST), or during configuration of the computer system. The core logic chipset of the present invention uses one of its arbiters and has Request ("REQ") and Grant ("GNT") signal lines for the AGP device and each PCI device on the primary PCI bus.

The second memory interface, according to the present invention, may be configured for connection to a dynamic random access memory (DRAM), such as synchronous DRAM (SDRAM), "RAMBUS" ("RAMBUS" is a registered trademark of Rambus Inc.) such as Direct Rambus technology, and the like. The primary and second memory interfaces may determine the type and size of memory connected thereto by various means, such as for example but not limitation: Presence Detect disclosed in IBM Corporation Application Notes for dual in-line memory modules (DIMM), and Serial Presence Detect (SPD) as more fully described in the "PC SDRAM Serial Presence Detect (SPD) Specification" Revision 1.2A, December, 1997, available from the Intel Corporation.

The main memory of the computer system may be configured into two banks sharing a common address range if each bank is of the same size. The first bank of memory may be used to access even cache line address boundaries and the second bank of memory may be used to access odd cache line address boundaries. The first memory bank may be connected to the primary memory interface and the second memory bank may be connected to the second memory interface. The present invention contemplates using, external to the chipset, bus transceivers to latch and electrically separate the addresses of the even and odd cacheline memory banks. This configuration potentially yields the highest system memory performance because it allows the two memory interfaces to access each memory bank in a balanced fashion, thus reducing memory access contentions. If an AGP interface is needed in the computer system, the system memory may be connected to just the primary memory interface.

Another embodiment utilizes the second memory interface for a different size and/or type of memory then does the primary memory interface. In this embodiment, the address ranges of the different size and/or type of memories connected to the primary and second memory interfaces would be different, e.g., the second memory interface addresses could start above the last address of the primary memory interface. The second memory interface could also accommodate any different timing and/or protocol required by the different memory.

The embodiments of the invention contemplate a multiple use core logic chipset which may be one or more integrated circuit devices such as an Application Specific Integrated Circuit ("ASIC"), Programmable Logic Array ("PLA") and the like. An AGP device may be embedded on the computer system motherboard, or may be on a separate card which plugs into a corresponding AGP card edge connector attached to the system motherboard and connected to the multiple use core logic chipset. The AGP and PCI card edge connectors are standard AGP and PCI connectors as more fully defined in the respective AGP and PCI specifications referenced hereinabove.

The multiple use core logic chipset of the present invention may be used in conjunction with a specific use printed circuit motherboard for a workstation, personal computer, portable computer, or a network server. In this embodiment, the type of motherboard may be adapted to apply hardware signal inputs to the core logic chipset for determining the configuration (AGP or second memory interface) thereof. The multiple use core logic chipset may also be configured to provide the AGP or second memory interface by software selection and is within the scope of the present invention.

An advantage of the present invention is being able to use the same multiple use core logic chipset across different types of computer products. This feature increases the quantity of these chipsets being manufactured, thus resulting in a corresponding decrease in the cost per chipset.

As discussed above, the multiple use core logic chipset may have signal inputs for configuring whether it functions as an AGP interface or a second memory interface, however, it is also contemplated in the present invention that the multiple use chipset may be software programmed to select either the AGP or the second memory interface function. When the computer system is first powered on and POST begins, the startup configuration software must scan the PCI bus or buses to determine what PCI devices exist and what configuration requirements they may have. This process is commonly referred to as enumerating, scanning, walking or probing the bus. It may also be referred to as the discovery process. The software program that performs the discovery process may be referred to as the PCI bus enumerator.

According to the PCI specification, all PCI devices must implement a base set of configuration registers. The PCI device may also implement other required or optional configuration registers defined in the PCI specification. The PCI specification also defines configuration registers and information to be contained therein for a PCI compliant device so as to indicate its capabilities and system requirements. Once the information for all of the bus devices is determined, the core logic may be configured as a second random access memory interface by the startup software.

Other and further features and advantages will be apparent from the following description of presently preferred embodiments of the invention, given for the purpose of disclosure and taken in conjunction with the accompanying drawings.

DETAILED DESCRIPTION OF THE PREFERRED EMBODIMENTS

Figure 1:
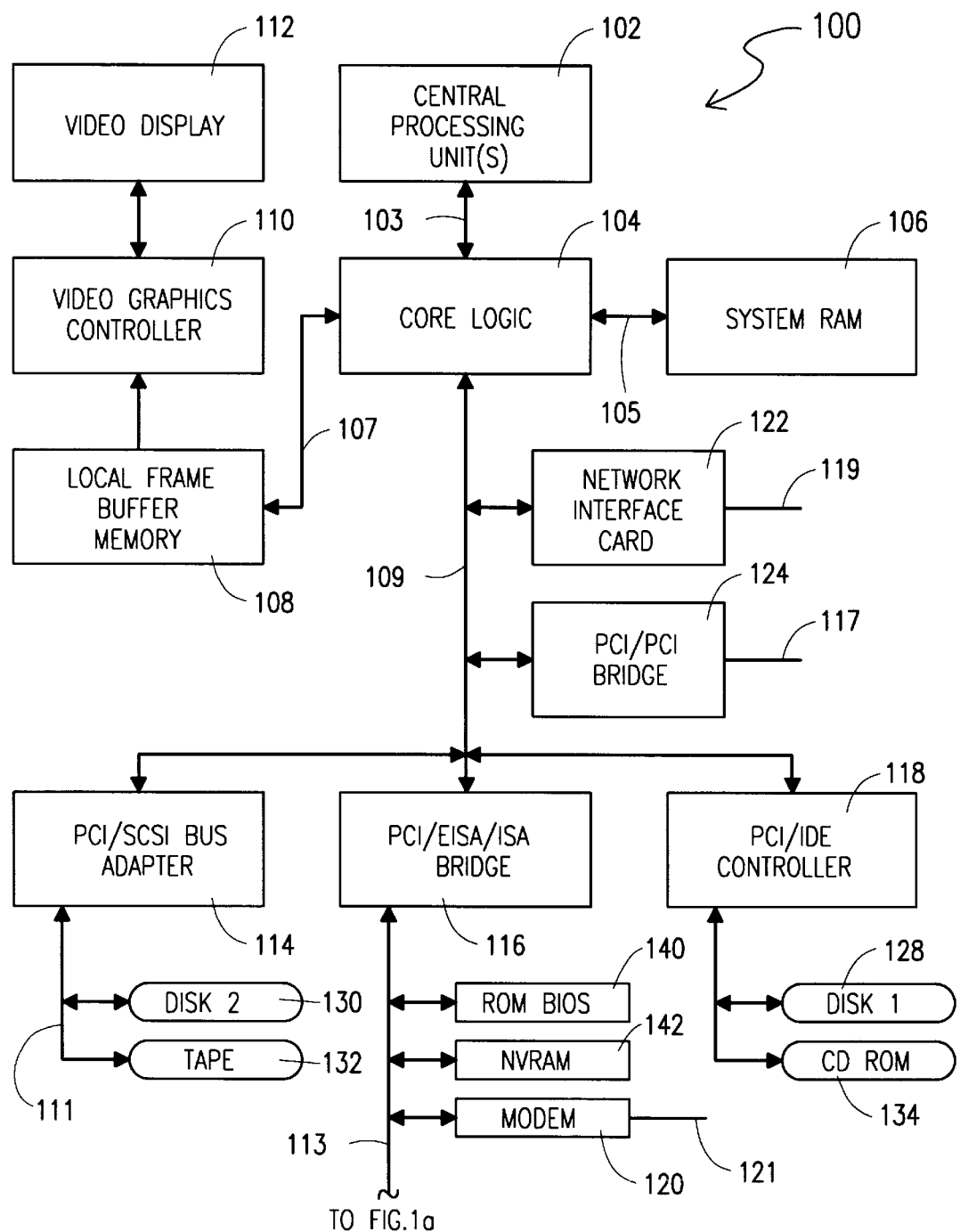
FIGS. 1, 1*a* is a schematic block diagram of a computer system having a primary PCI bus, an AGP bus and a single memory interface.

The present invention is an apparatus, method and system for providing in a computer system a multiple use core logic chipset capable of implementing either a bridge between the host and memory buses and an AGP bus, or a bridge between the host and memory buses and a second memory interface.

The AGP bus was developed to have sufficient data bandwidth for a video controller in a computer system, up to 532 megabytes per second ("MB/s"), to run increasingly complex three dimensional ("3-D") graphics applications such as, for example, games and engineering simulations. Not all computer systems, however, need the capability of running 3-D graphics, but would greatly benefit by having an additional memory bus and increased memory bandwidth for NICs, PCI/PCI bridge, PCI/SCSI bridge, and the like. Computers used as network servers require merely simple two-dimensional ("2-D") graphics, thus the AGP bus is an overkill for this type of computer.

The AGP interface specification is a derivation or superset of the PCI interface specification and thus shares many common signal functions. Furthermore, the AGP bridge connects to the processor host bus and system memory bus through the computer system core logic chipset, thus it would be desirable to use the chipset logic and driver circuits for a second memory interface. An integrated circuit such as an application specific integrated circuit (ASIC), is external connection (pin or ball grid) limited but not gate (internal transistor) limited. Thus some of the external connections of the ASIC core logic chipset could be used for either an AGP interface or a second memory interface even if the signals for each interface had to be internally switched between the common external connections. This enhances the versatility of the core logic chipset and reduces the overall cost of computer systems, both workstation and network servers, by having a common multiple use core logic chipset that could be manufactured in large volumes so as to cover all types of computer configurations.

For illustrative purposes, a preferred embodiment of the present invention is described hereinafter for a computer system utilizing the Intel x86 microprocessor architecture and certain terms and references will be specific to that processor platform. AGP and PCI are interface standards, however, that are hardware independent and may be utilized with any host computer designed for these interface standards. It will be appreciated by those skilled in the art of computer systems that the present invention may be adapted and applied to any computer platform utilizing the AGP interface standard or system memory comprising two memory ports or interfaces.

The PCI specifications referenced above are readily available and are hereby incorporated by reference. The AGP specification entitled "Accelerated Graphics Port Interface Specification Revision 1.0," dated Jul. 31, 1996, as referenced above is readily available from Intel Corporation, and is hereby incorporated by reference. Further definition and enhancement of the AGP specification referenced above is more fully defined in "Compaq's Supplement to the 'Accelerated Graphics Port Interface Specification Version 1.0'," Revision 0.8, dated Apr. 1, 1997, and is hereby incorporated by reference. Both of these AGP specifications were included as Appendices A and B in commonly owned co-pending U.S. patent application Ser. No. 08/853,289 now U.S. Pat. No. 5,889,970; filed May 9, 1997, entitled "Dual Purpose Apparatus, Method and System for Accelerated Graphics Port and Peripheral Component Interconnect" by Ronald Horan and Sompong P. Olarig, and which is hereby incorporated by reference.

Figure 1A:
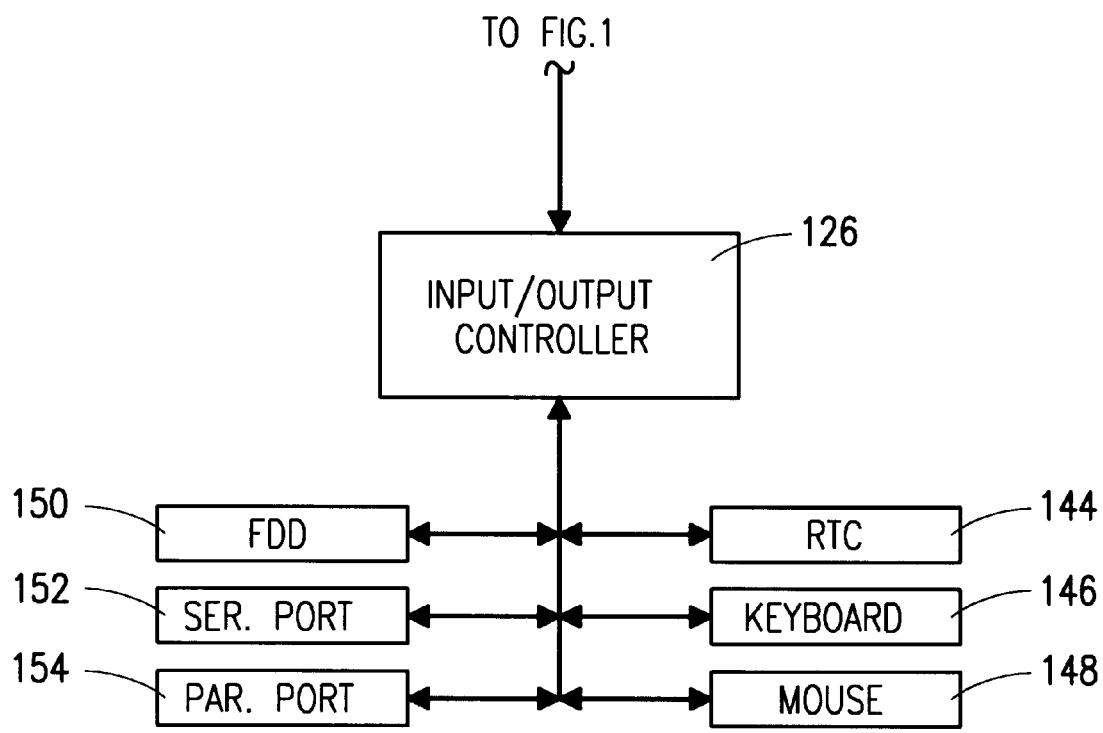

Referring now to the drawings, the details of preferred embodiments of the present invention are schematically illustrated. Like elements in the drawings will be represented by like numbers, and similar elements will be represented by like numbers with a different lower case letter suffix. Referring now to FIG. 1 and FIG. 1a a schematic block diagram of a computer system utilizing AGP and PCI buses, and a single system memory interface is illustrated. The computer system is generally indicated by the numeral 100 and comprises a central processing unit ("CPU") 102, core logic 104, system random access memory ("RAM") 106, a video graphics controller 110, a local frame buffer memory 108, a video display 112, a PCI/SCSI bus adapter 114, a PCI/EISA/ISA bridge 116, and a PCI/IDE controller 118. Single or multilevel cache memory (not illustrated) may also be included in the computer system 100 according to the current art of microprocessor computers. The CPU 102 may be a plurality of CPUs 102 in a symmetric or asymmetric multi-processor configuration.

Figure 5:
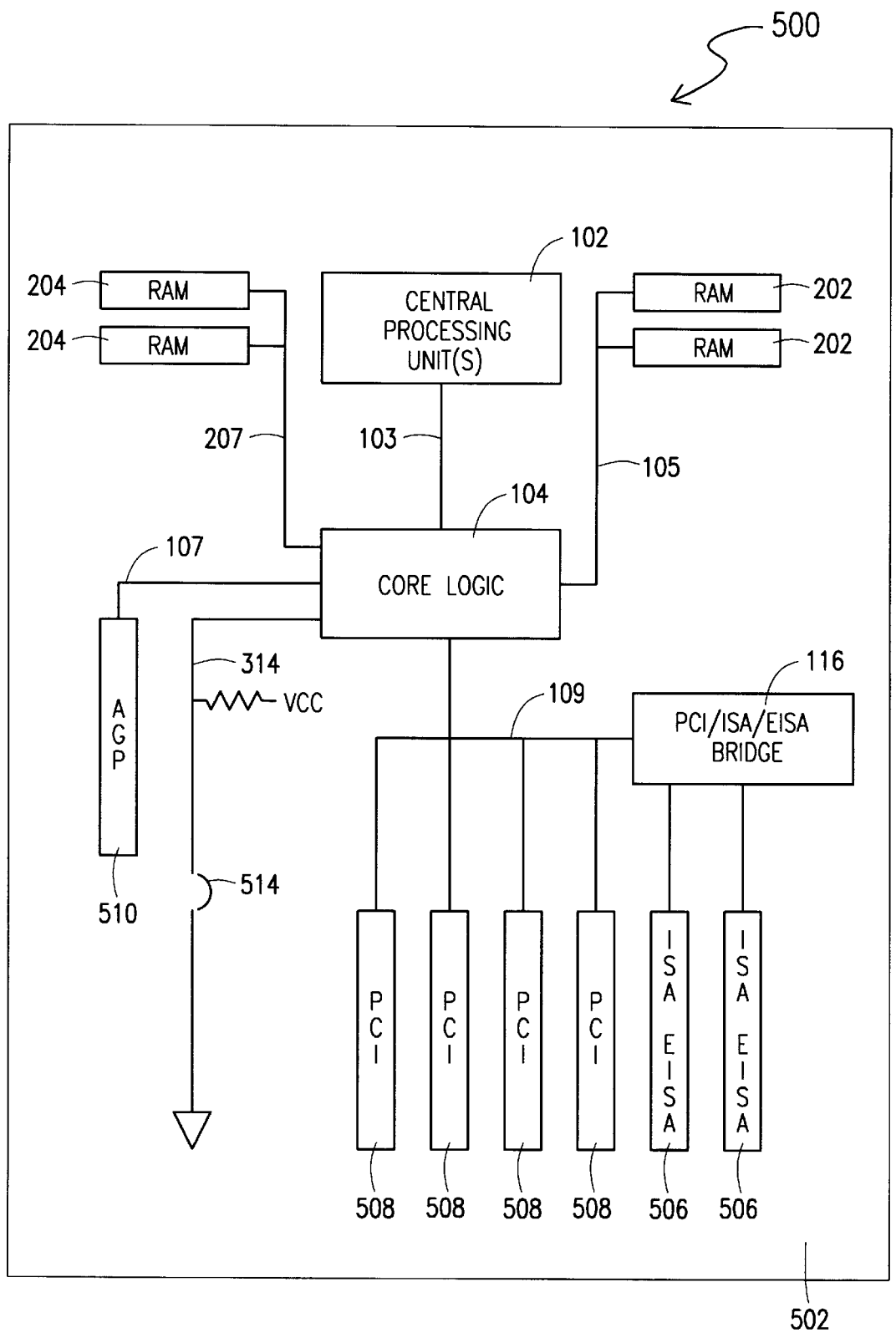
FIG. 5 is schematic plan view of a computer system motherboard, according to the present invention.

The CPU 102 is connected to the core logic 104 through a host bus 103. The system RAM 106 is connected to the core logic 104 through a first memory bus 105. The video graphics controller 110 is connected to the local frame buffer memory 108, which is connected to the core logic 104 through an AGP bus 107. The PCI/SCSI bus adapter 114, PCI/EISA/ISA bridge 116, and PCI/IDE controller 118 are connected to the core logic 104 through a PCI bus 109. Also connected to the PCI bus 109 are a network interface card ("NIC") 122, and a PCI/PCI bridge 124. Some of the PCI devices such as the NIC 122 and PCI/PCI bridge 124 may plug into PCI connectors on the computer system 100 motherboard (FIG. 5).

Hard disk 130 and tape drive 132 are connected to the PCI/SCSI bus adapter 114 through a SCSI bus 111. The NIC 122 is connected to a local area network 119. The PCI/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive ("FDD") 150, and serial/parallel ports 152, 154. The EISA/ISA bus 113 is a slower information bus than the PCI bus 109, but it costs less to interface with the EISA/ISA bus 113. The PCI/IDE controller 118 interfaces to an IDE disk 128 and IDE CD ROM drive 134.

Figure 2:
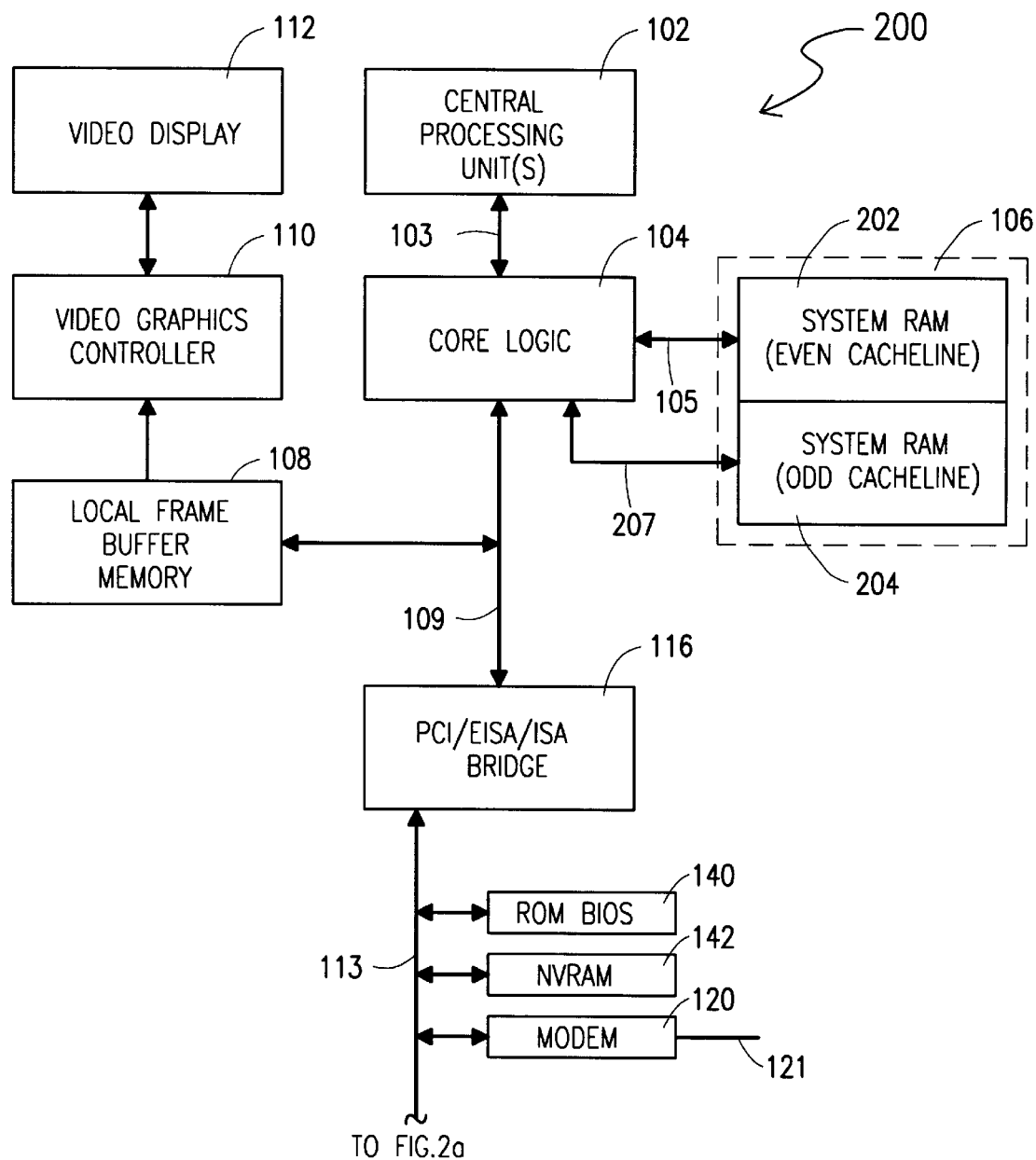
FIGS. 2, 2*a* and 2A are schematic block diagrams of computer systems having first and second memory interfaces, according to the present invention.
Figure 2A:
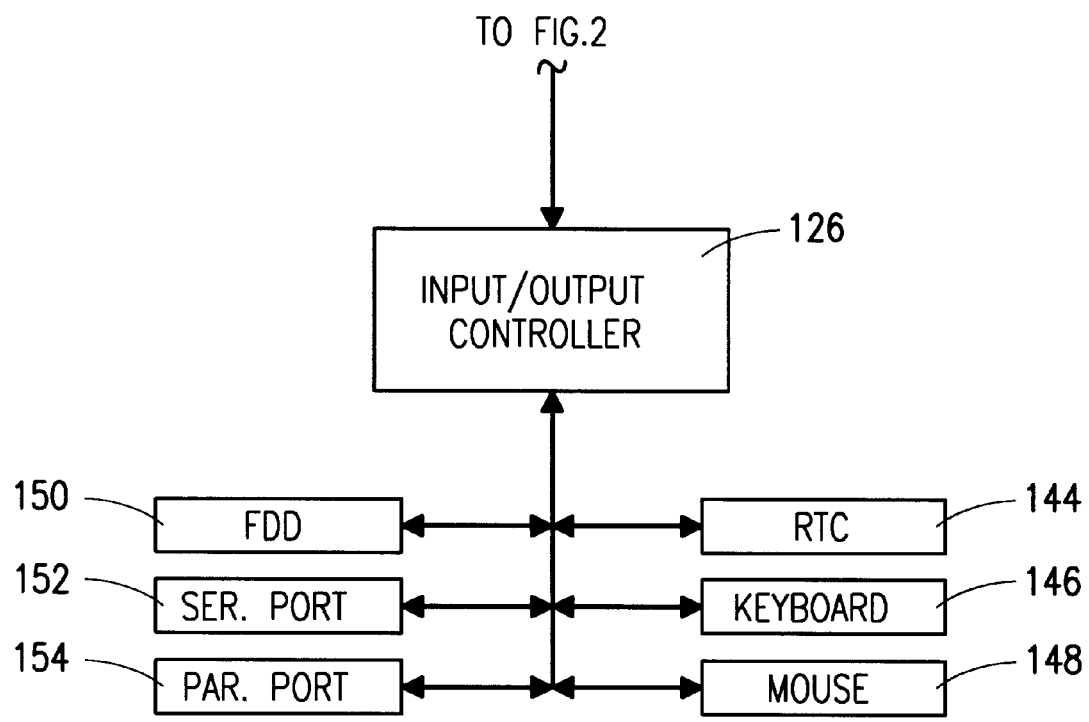
Figure 2A:
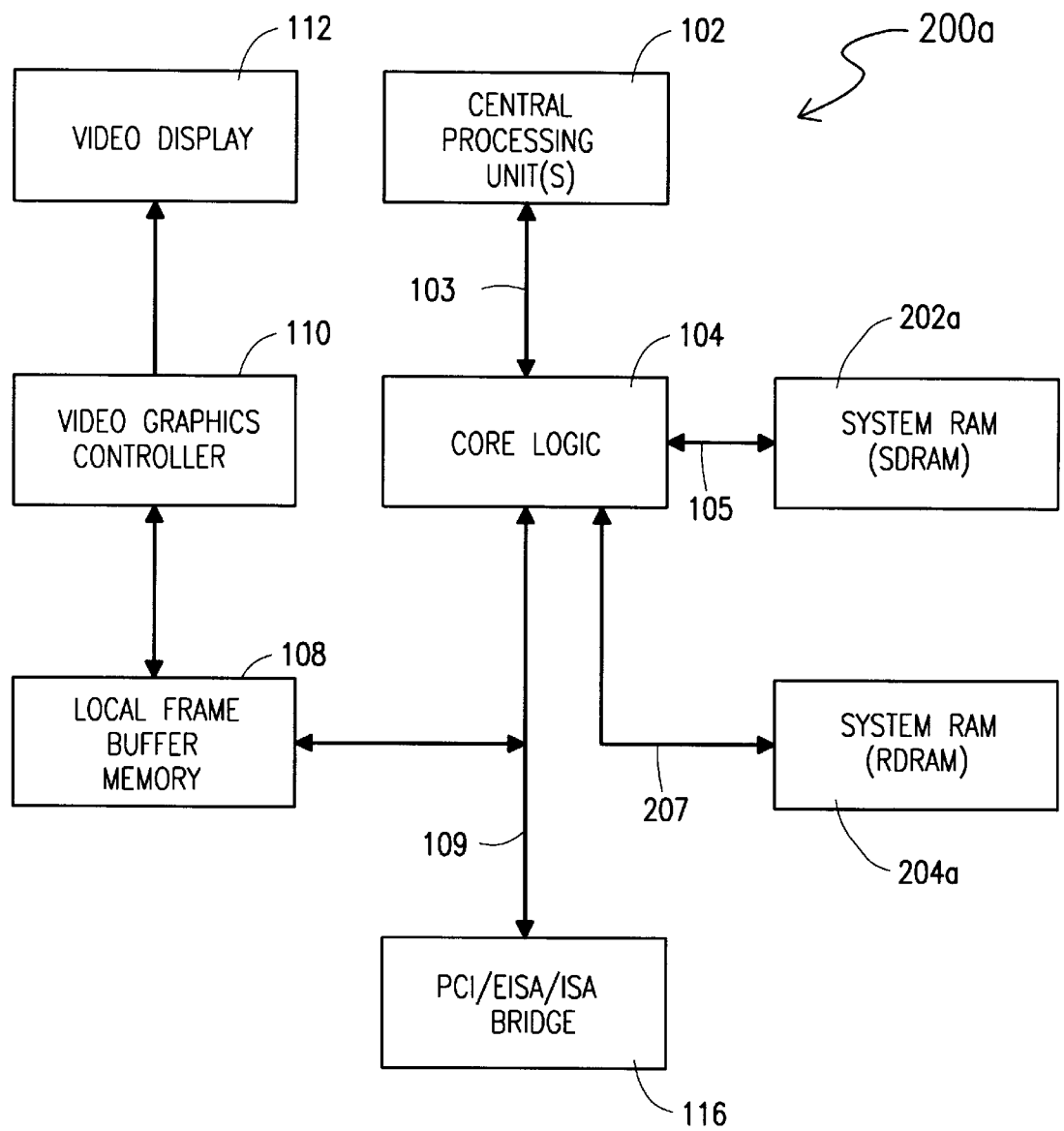

Referring now to FIG. 2 and FIG. 2a, a schematic block diagram of a computer system having first and second memory interfaces is illustrated. In the embodiment of FIG. 2, the local frame buffer memory 108 is now connected to the primary PCI bus 109 instead of the AGP bus 107 (FIG. 1, 1a), and a second memory bus 207 connects the second memory interface in the core logic 104 to a second memory bank 204 of the RAM 106. The second memory bus may use the same external connections as used by the AGP bus 107 (FIG. 1, 1a), the core logic chip set 104 may have additional dedicated external connections for the second memory bus 207, or any combination thereof A first memory bank 202 of the RAM 106 connects to the first memory interface in the core logic 104 through the first memory bus 105. The first memory bank 202 and the second memory bank 204 may be share the same memory address space and be interleaved into even and odd cacheline addresses if both are of the same address size. It is contemplated and within the scope of the present invention to interface to the same or two different types of random access memory connected to the first memory bus 105 and the second memory bus 207, respectively.

If the first memory bank 202 and the second memory bank 204 are not the same size then the address space of the second memory bank 204 would be above the address space of the first memory bank 202. Referring now to FIG. 2A, a partial schematic block diagram of a computer system 200a having different sizes and/or types of system RAM is illustrated. The first system RAM 202a is connected to the first memory bus 105 and the second system RAM 204a is connected to the second memory bus 207. The two memory interfaces in the core logic 104 may determine the type and size of each RAM memory connected thereto using, for example, the presence detect described hereinabove.

Figure 3:
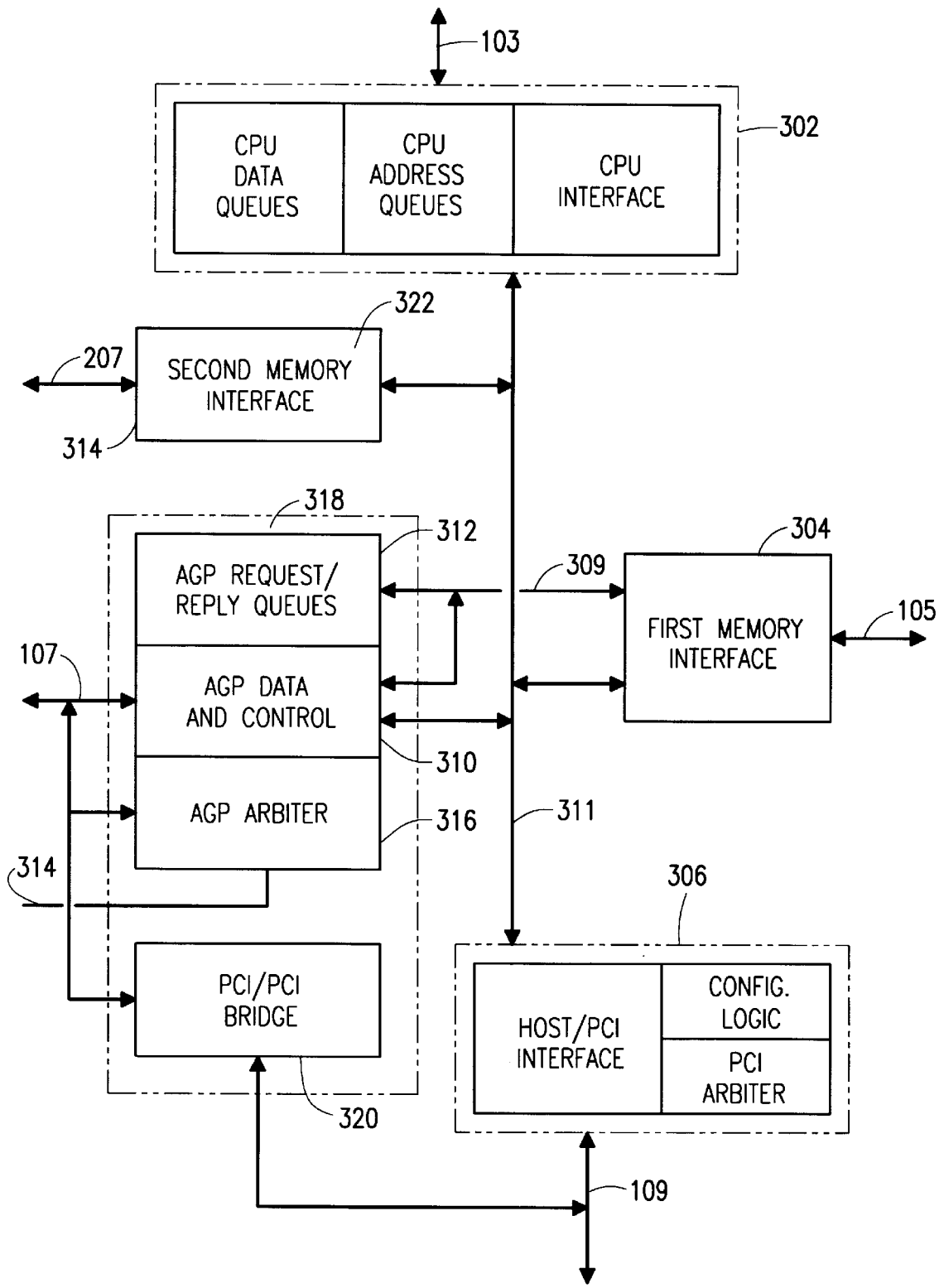
FIG. 3 is a schematic block diagram of the core logic of FIGS. 1, 1*a*, 2, and 2*a* according to the present invention.

Referring now to FIG. 3, a schematic functional block diagram, according to the present invention, of the core logic of FIGS. 1, 2 and 2A is illustrated. The core logic 104 may be configured as either an AGP interface connected to the AGP bus 107 or a second memory interface connected to the second memory bus 207. The core logic 104 functionally comprises a CPU host bus interface and queues 302, first memory interface 304, second memory interface 322, host/PCI bridge 306, and AGP logic 318. The AGP logic 318 comprises AGP arbiter 316, AGP data and control 310, and AGP request/reply queues 312. The CPU host bus interface and queues 302 connects to the host bus 103 and includes interface logic for all data, address and control signals associated with the CPU 102 of the computer system 100. Multiple CPUs 102 and cache memory (not illustrated) are contemplated and within the scope of the present invention. The CPU host bus interface and queues 302 interfaces with the host/PCI bridge 306, the first memory interface 304, and the second memory interface 322 over a core logic bus 311. The CPU host bus interface and queues 302 interfaces with the AGP data and control 310, and AGP request/reply queues 312 over the core logic bus 311. The first memory interface 304 interfaces with the AGP data and control 310, and AGP request/reply queues 312 over a core logic bus 309. An advantage of having individual core buses 309 and 311 is that concurrent bus operations may be performed thereover.

For example, video data stored in system RAM 106 may be transferring to the video graphics controller 110 (AGP device) while the CPU 102 on the host bus 103 is accessing an independent PCI device (e.g., NIC 122) on the PCI bus 109.

The host bus interface and queues 302 allows the CPU 102 to pipeline cycles and schedule snoop accesses. The first memory interface 304 controls the control and timing signals for the computer system RAM 106 that may be dynamic RAM such as synchronous dynamic RAM (SDRAM), Rambus DRAM (RDRAM), and the like. The memory interface 304 has an arbiter (not illustrated) which selects among memory accesses for CPU writes, CPU reads, PCI writes, PCI reads, AGP reads, AGP writes, and dynamic memory refresh. A core logic arbiter is more fully disclosed in commonly owned co-pending U.S. patent application Ser. No. 09/038,412; filed Mar. 11, 1998; entitled "Accelerated Graphics Port Programmable Memory Access Arbiter" by Ronald T. Horan, Phillip M. Jones, Gregory N. Santos, Robert Allan Lester and Gary J. Piccirillo; and is hereby incorporated by reference.

Arbitration may be pipelined into a current memory cycle, which insures that the next memory address is available on the memory bus 105 before the current memory cycle is complete. This results in minimum delay, if any, between memory cycles. The first memory interface 304 also is capable of reading ahead on PCI initiator reads when a PCI initiator issues a read multiple command, as more fully described in the PCI 2.1 Specification. When the core logic 104 is configured for the second memory interface 322 the second bank of memory, RAM 204 (FIGS. 2 and 2A) is similarly controlled. The host/PCI bridge 306 controls the interface to the PCI bus 109. When the CPU 102 accesses the PCI bus 109, the host/PCI bridge 306 operates as a PCI initiator. When a PCI device is an initiator on the PCI bus 109, the host/PCI bridge 306 operates as a PCI target. The host/PCI bridge 306 contains base address registers for an AGP device target (not illustrated).

The AGP logic 318 comprises a PCI/PCI bridge 320, AGP arbiter 316, AGP data and control 310, and AGP request/reply queues 312. The AGP data and control 310 and AGP request/reply queues 312 interface to the AGP bus 107 which is configured for signal, power and ground connections (not illustrated) in accordance with the AGP interface standard incorporated by referenced hereinabove. An AGP/second memory interface control 314 may be used to select the function of the AGP logic 318 to be an AGP compliant interface or the second memory interface 322, depending on the desired purpose of the computer system 100. The AGP/second memory interface control 314 may be implemented in hardware (jumper straps) or through software (configuration of personality registers in the AGP logic 318). These personality registers are more fully defined in the AGP specifications incorporated by reference hereinabove. The AGP bus 107 is adapted for connection to a standard AGP connector.

The PCI/PCI bridge 320 is connected between the PCI bus 109 and the AGP bus 107. The PCI/PCI bridge 320 allows existing enumeration code (unmodified) to recognize and handle AGP compliant devices residing on the AGP/PCI bus 107. The PCI/PCI bridge 320, for example, may be used in determining whether an AGP device is connected to the AGP bus 107 by PCI bus enumeration during POST or computer system configuration.

Figure 4:
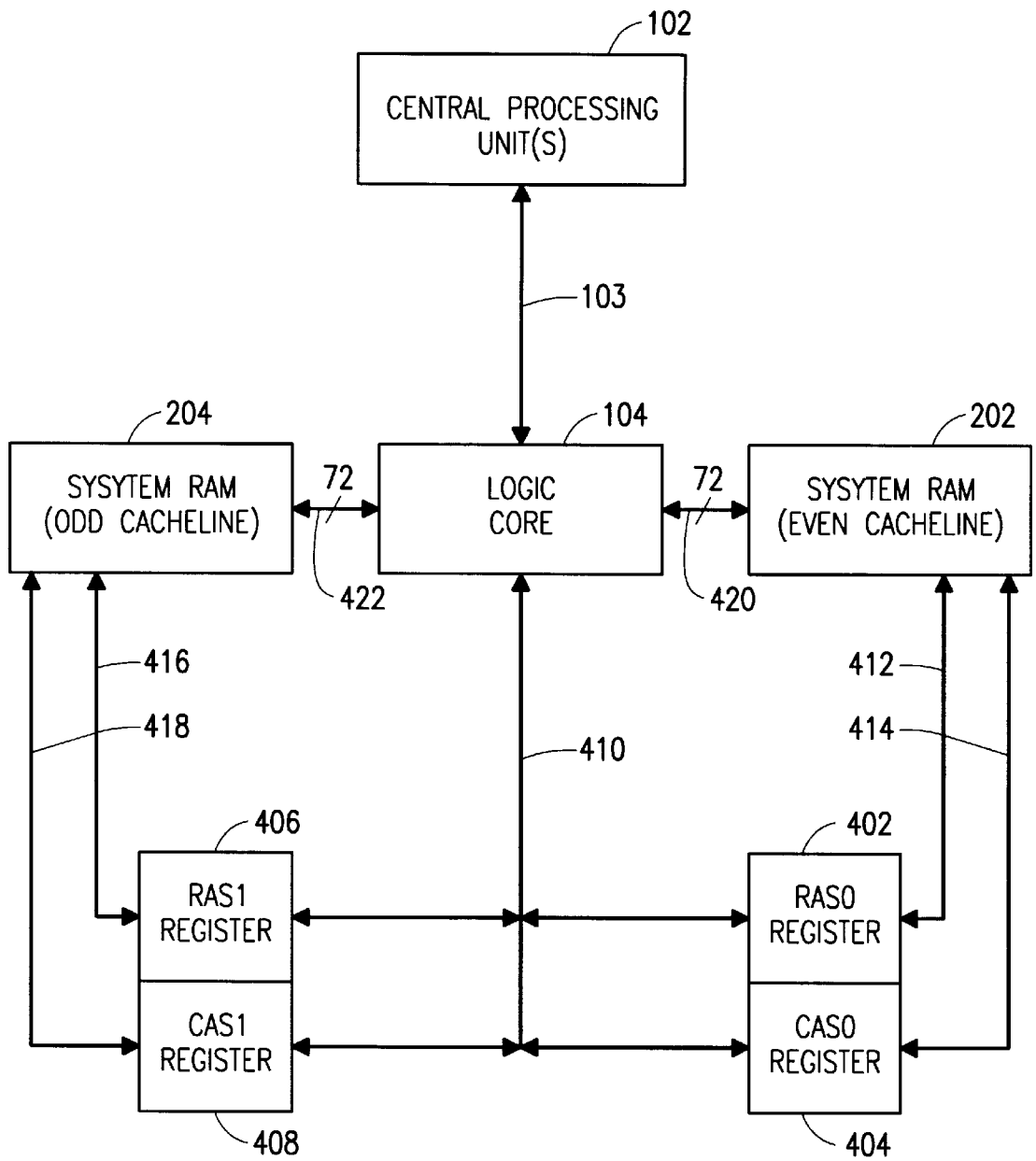
FIG. 4 is a schematic block diagram of a further embodiment of the present invention.

Referring now to FIG. 4, a schematic block diagram of a further embodiment of the present invention is illustrated.

The core logic 104 of FIG. 4 is configured as dual memory controllers having separate memory data and parity buses 420 and 422, and a common memory address and control bus 410. The common address and control bus 410 is connected to separate row and column address registers for each bank of the system memory. The RAS0 register 402 receives and stores the row address information, and the CAS0 register 404 receives and stores the column address information needed for addressing the even cacheline system RAM 202. The row and column address lines for RAM 202 are represented by numerals 412 and 414, respectively. Likewise, the RAS1 register 406 receives and stores the row address information, and the CAS1 register 408 receives and stores the column address information needed for addressing the odd cacheline system RAM 204. The row and column address lines for RAM 204 are represented by numerals 416 and 418, respectively. Use of the common address and control bus 410 reduces the number of external connections required on the core logic 104 package. Latching the address information for each bank of the system memory 106 allows concurrent memory addressing, thus improving the speed of memory accesses by allowing concurrent data transfers over the separate data and parity buses 420 and 422. A typical width of a memory data bus may be 64 bits and the associated error correcting code (ECC) may be eight bits for a total of 72 bits of information for each of the buses 420 and 422.

Referring to FIG. 5, a schematic plan view of a computer system motherboard is illustrated, according to the present invention. The computer system motherboard 500 comprises a printed circuit board on which components and connectors are mounted thereto. The printed circuit board 502 comprises conductive printed wiring that is used to interconnect the components and connectors thereon. The conductive printed wiring (illustrated as buses 103, 105, 107, 109 and 207) may be arranged into signal buses having controlled impedance characteristics. On the printed circuit board 502 are the core logic 104, CPU(s) 102, even cacheline RAM 202, odd cacheline RAM 204, PCI/ISA/EISA bridge 116, ISA/EISA connectors 506, PCI connectors, and an AGP connector 510.

The core logic 104, according to the present invention, is multiple use, operable as either an AGP interface or a second memory interface, and may be configured for either one by a hardware jumper 514. It is also contemplated and within the scope of the claimed invention to configure the core logic 104 by writing to configuration registers within the core logic during system configuration or POST. This allows computer system software to configure the core logic 104 after enumerating the various computer system buses to determine if an AGP device is connected to the AGP bus 107, or a second system memory is connected to the second memory bus 207. A feature of the present invention allows automatic configuration of the core logic as an AGP interface if an AGP compliant device (not illustrated) is detected on the bus 107 or as a second memory interface if a second system memory is detected on the second memory bus 207. The PCI connectors 508 are connected to the computer system primary PCI bus 109 The PCI connectors 508 and AGP connector 510 are standard connectors as more fully described in the PCI 2.1 Specification and AGP Specification incorporated by reference hereinabove.

Figure 6:
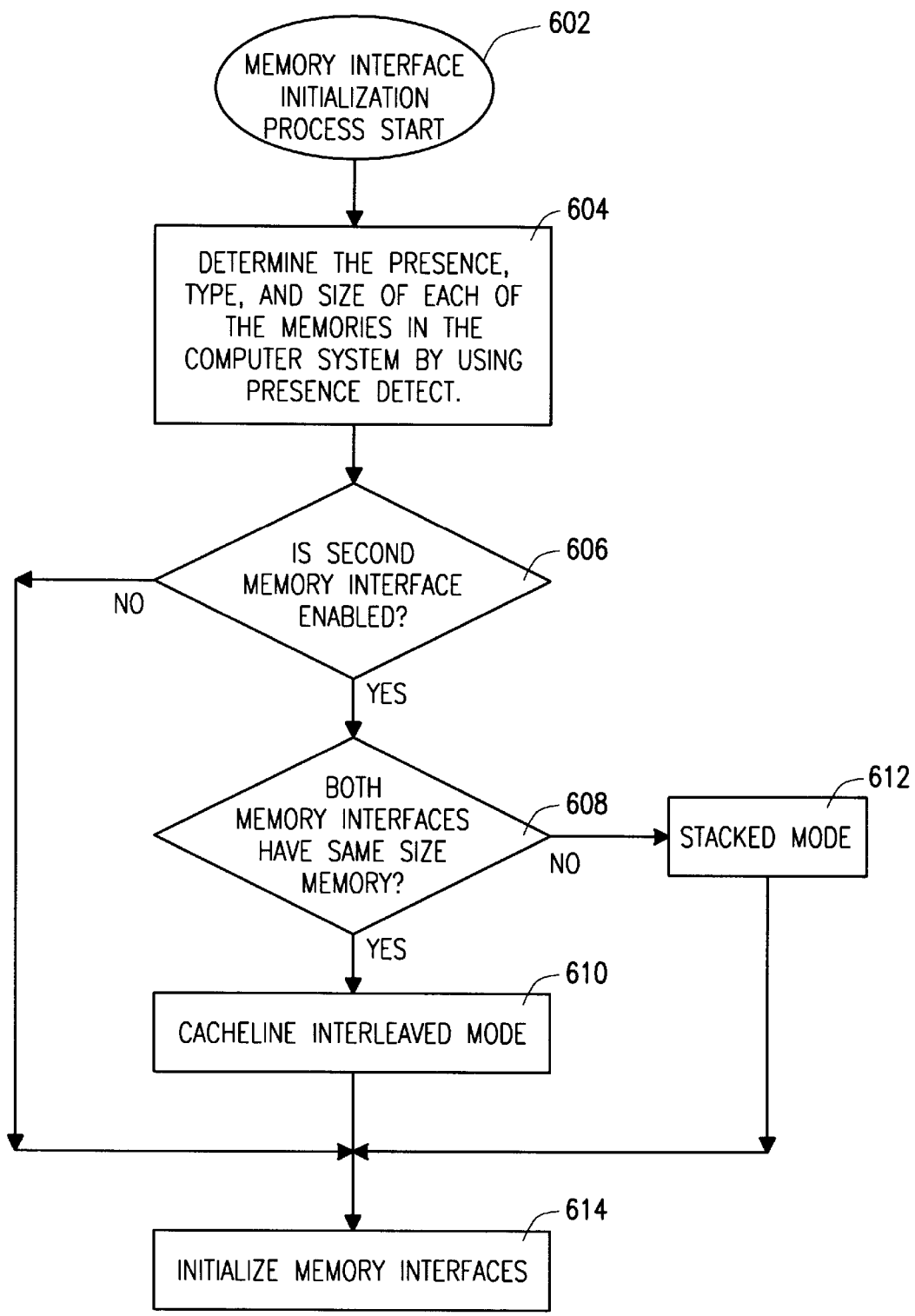
FIG. 6 is a flow diagram according to the present invention.

Referring now to FIG. 6, a flow diagram of the initialization of the memory interface(s) is illustrated. Step 602 starts the memory interface initialization process by determining the presence, type and size of each of the memories connected to the respective memory interfaces (304, 322 of FIG. 3) by using for example, presence detect in step 604. Step 606 determines if the second memory interface (322 of FIG. 3) is enabled, and if so, step 608 determines if both of the memory interfaces (304, 322) are connected to the same size of memory. The memory types may be different between the two memory interfaces, according to the invention, but if the size of each of the memories is the same, they may be interleaved in step 610. If the two memories are of different sizes then addressing of the two memories is allocated as two different address spaces. The memory connected to the first memory interface 304 may be addressed in the lower address space, and the memory connected to the second memory interface 322 may be addressed in an upper address space just above the aforementioned lower address space, e.g., the two address spaces are stacked in step 612. Once the determination of whether addressing of the two memories will be interleaved or stacked is made, the memory interfaces (304, 322) are appropriately initialized in step 614.

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A computer system having a core logic chipset configurable for either an accelerated graphics port (AGP) or a second memory port, said system comprising:

a central processing unit connected to a host bus;

a first random access memory connected to a first random access memory bus;

a core logic chipset connected to the host bus and the first random access memory bus;

said core logic chipset configured as a first interface bridge between the host bus and the first random access memory bus, a second interface bridge between the host bus and a peripheral component interconnect bus, and a third interface bridge between the first random access memory bus and the peripheral component interconnect bus;

said core logic chipset configurable as a fourth interface bridge between the first random access memory bus and an accelerated graphics port (AGP) bus when a configuration signal is at a first logic level;

said core logic chipset configurable as a fifth interface bridge between the host bus and the AGP bus when the configuration signal is at the first logic level; and said core logic chipset configurable as a sixth interface bridge between the host bus and a second random access memory bus when the configuration signal is at a second logic level.

2. The computer system of claim 1, wherein the central processing unit is a plurality of central processing units.

3. The computer system of claim 1, wherein the core logic chipset is at least one integrated circuit.

4. The computer system of claim 3, wherein the at least one integrated circuit core logic chipset is at least one application specific integrated circuit.

5. The computer system of claim 3, wherein the at least one integrated circuit core logic chipset is at least one programmable logic array integrated circuit.

6. The computer system of claim 1, further comprising at least one peripheral component interconnect device, the at least one peripheral component interconnect device connected to the peripheral component interconnect bus.

7. The computer system of claim 1, further comprising an AGP device connected to the AGP bus.

8. The computer system of claim 7, wherein the configuration signal is software controllable and is set to the first logic level when the AGP device is determined to be connected to the AGP bus.

9. The computer system of claim 1, further comprising a second random access memory connected to the second random access memory bus.

10. The computer system of claim 9, wherein the configuration signal is software controllable and is set to the second logic level when the second random access memory is determined to be connected to the second random access memory bus.

11. The computer system of claim 1, wherein the host bus, AGP bus, PCI bus, first and second random access memory buses, and core logic chipset are on a printed circuit board.

12. The computer system of claim 11, wherein the configuration signal logic level is determined by a hardwired jumper circuit on the printed circuit board.

13. The computer system of claim 1, wherein the configuration signal logic level is determined by software.

14. The computer system of claim 13, wherein the configuration signal logic level is determined during power on self test of the computer system.

15. The computer system of claim 13, wherein the configuration signal logic level is determined during configuration of the computer system.

16. A method, in a computer system, of configuring a core logic chipset for either an accelerated graphics port (AGP) bus or a second memory port, said method comprising the steps of:

providing a central processing unit connected to a host bus;

providing a first random access memory connected to a random access memory bus;

providing a core logic chipset connected to the host bus and the first random access memory bus;

configuring said core logic chipset as a first interface bridge between the host bus and the first random access memory bus, a second interface bridge between the host bus and a first peripheral component interconnect bus, and a third interface bridge between the random access memory bus and the first peripheral component interconnect bus;

configuring said core logic chipset as a fourth interface bridge between the first random access memory bus and an accelerated graphics port (AGP) bus when detecting a configuration signal at a first logic level;

configuring said core logic chipset as a fifth interface bridge between the host bus and the AGP bus when detecting the configuration signal at the first logic level; and configuring said core logic chipset configurable as a sixth interface bridge between the host bus and a second random access memory bus when detecting the configuration signal at a second logic level.

17. The method of claim 16, further comprising setting the configuration signal logic level with a hardware jumper.

18. The method of claim 16, further comprising setting the configuration signal logic level with software running in the computer system.

19. The method of claim 18, wherein the step of setting the configuration signal to the first logic level is done when an AGP device is detected.

20. The method of claim 18, wherein the step of setting the configuration signal to the second logic level is done when a second random access memory is detected.

21. A core logic chipset configurable for either an accelerated graphics port (AGP) or a second memory port, comprising:

a processor interface adapted for connection to a computer system processor bus having at least one central processing united connected thereto;

a first memory interface adapted for connection to a first random access memory bus;

a second memory interface adapted for connection to a second random access memory bus;

an accelerated graphics port (AGP) interface adapted for connection to an AGP bus;

a peripheral component interconnect (PCI) interface adapted for connection to a PCI bus;

said AGP interface comprises a request queue, a reply queue, data and control logic, an arbiter, and a PCI to PCI bridge;

said AGP request and reply queues are connected to said first memory interface and said processor interface;

said PCI interface is connected to said first memory interface and said processor interface;

said PCI to PCI bridge is connected to said AGP data and control logic, wherein said PCI to PCI bridge transfers PCI information transactions between said PCI bus and said AGP data and control logic;

said AGP interface is functionally enabled when a control signal having a first logic level is detected; and said second memory interface is functionally enabled when the control signal having a second logic level is detected.

22. The core logic chipset according to claim 21, wherein said control signal logic level is determined by a hardware jumper signal connected to said AGP and second memory interfaces.

23. The core logic chipset according to claim 21, wherein said control signal logic level is determined by software configuring a control register in said core logic chipset.

* * * * *